United States Patent

[11] 3,542,198

| [72] | Inventor | Olov Birger Borjeson<br>Bromma, Sweden |
|---|---|---|
| [21] | Appl. No. | 708,307 |
| [22] | Filed | Feb. 26, 1968 |
| [45] | Patented | Nov. 24, 1970 |
| [73] | Assignee | A B Purac<br>Lund, Sweden<br>a corporation of Sweden |
| [32] | Priority | March 10, 1967 |
| [33] | | Sweden |
| [31] | | No. 3322/1967 |

[54] FILTER UNIT FOR FIBROUS AND SIMILAR MATERIALS
7 Claims, 3 Drawing Figs.

[52] U.S. Cl. .................................................. 210/111,
210/115, 210/125, 210/327, 210/331, 210/334
[51] Int. Cl. ........................................................ B01d 33/28,
B01d 33/38

[50] Field of Search ........................................... 210/125,
324, 327, 330, 331, 334, 333, 111, 115

[56] References Cited
UNITED STATES PATENTS

| 2,406,065 | 8/1946 | Dickson et al. | 210/331X |
|---|---|---|---|
| 3,163,601 | 12/1964 | Ericson et al. | 210/327X |
| 3,221,887 | 12/1965 | Schade | 210/327 |

*Primary Examiner—* Reuben Friedman
*Assistant Examiner—* C. M. Ditlow
*Attorney—* Pierce, Scheffler & Parker ABSTRACT: A filter unit having at least one rotating, circular vertically disposed pair of filter discs between which a suspension is fed at approximately the mid point on one side of the discs, filtrate being removed near the bottom thereof and the residue being removed on the opposite side of the discs from the space between said discs.

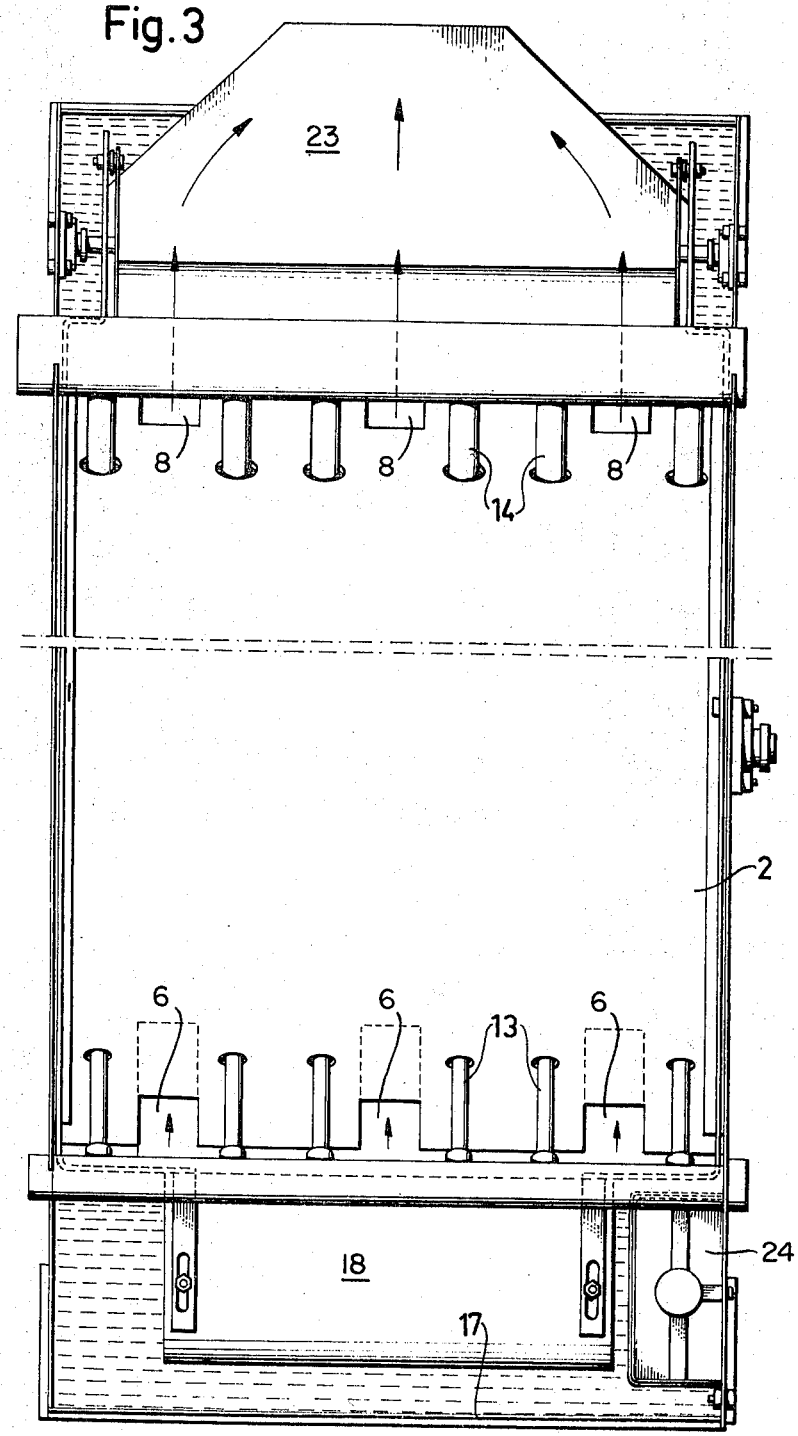

FILTER UNIT FOR FIBROUS AND SIMILAR MATERIALS

The invention concerns a filter unit for fibrous suspensions and similar materials, consisting of two or more pairs of spaced vertical filter discs contained within a cylindrical casing fitted with inlet and outlet openings.

The unit is principally characterized by the pairs of filter discs being circular and being rigidly fixed to a horizontal shaft which is rotatably mounted between the ends of the casing in such a way that there is a space formed between each pair of them and there is liquid-tight seal along their peripheral line of contact with the cylindrical surface of the casing. In a preferred constructional form of the invention, the space between a pair of filter discs is in communication with an inlet opening and a discharge opening having a spillway for the material that does not pass through the filter discs and has been separated from the filtrate. The discharge opening is situated substantially diametrically opposite the inlet opening, and the outlet opening for the purified liquid or filtrate is situated at the lower part of the filter unit and includes a means of controlling the liquid level. There is at the lowest point of the filter unit a sump pipe connected to the space between the pairs of filter discs, which has the function of collecting impurities heavier than the pulp or suspension, and through which it is possible if desired to supply to the space between the pairs of filter discs the suspension or a part thereof.

Figure 1:
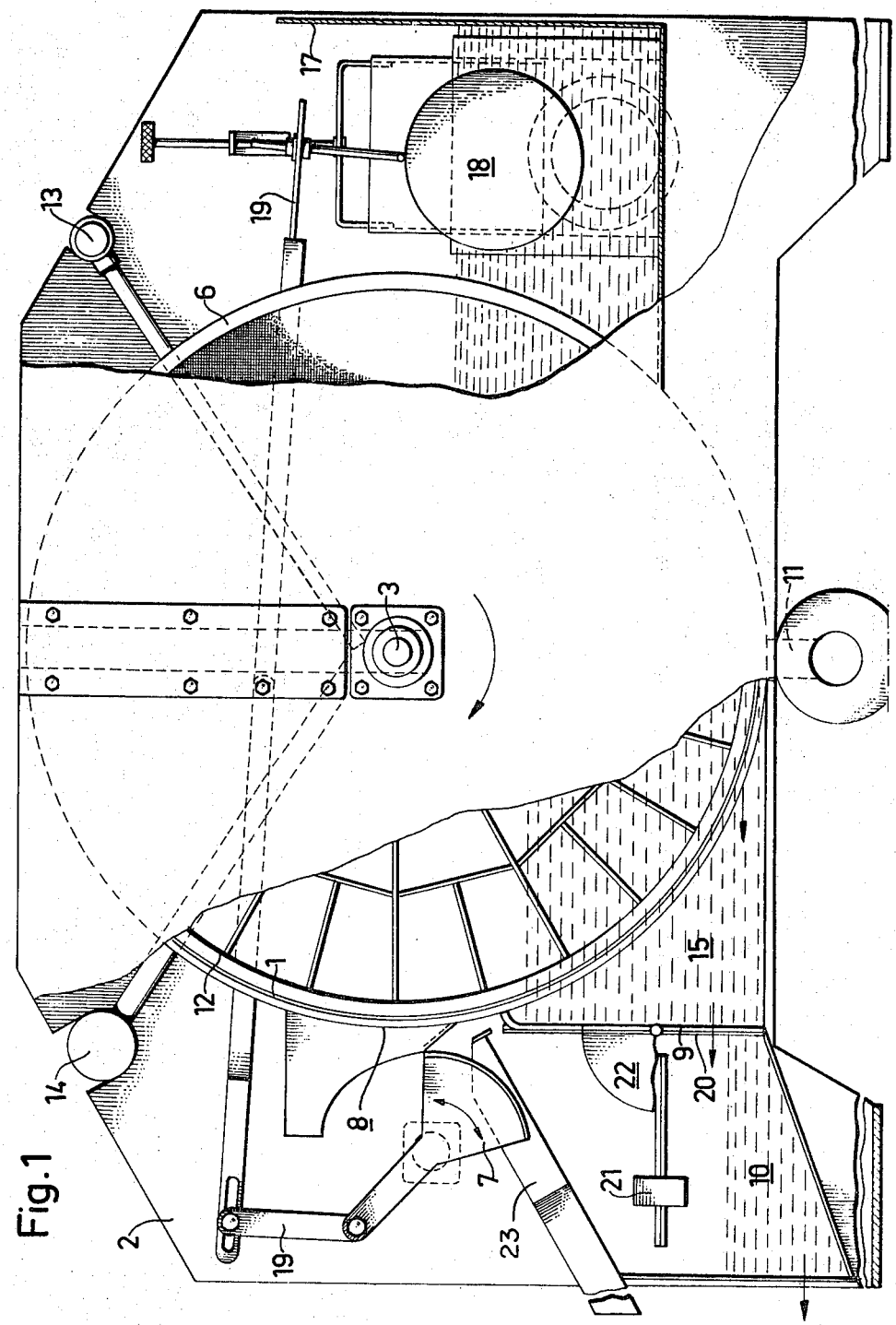
Figure 2:
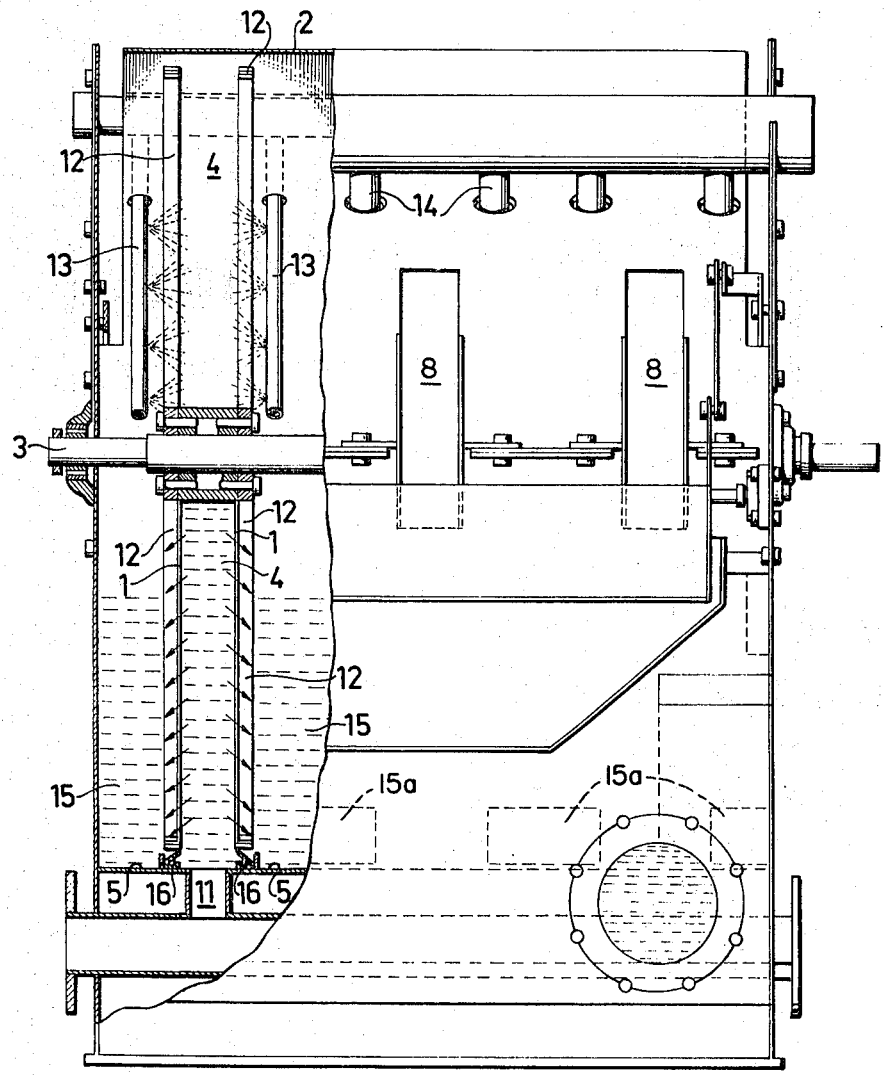

A favourable constructional form of the invention will not be described in detail with reference to the attached drawings. FIG. 1 shows a partial cross section of the unit seen from one side, and FIG. 2 a partial cross section from one end. FIG. 3 is a plan of the unit.

Casing 2 serves as the body of the unit and is connected to a base. There is mounted in casing 2 a horizontal shaft 3 fitted with a hub in such a way that it is capable of rotation, onto which are fixed pairs of spaced spoked wheels 12. Each of the wheels 12 serves as support for a circular filter disc 1 rigidly fixed to shaft 3. The disc may be either a filter mesh or a sieve plate. Owing to the fact that pairs of wheels 12 are fitted onto shaft 3 with a space between them, there is a space 4 formed between the pairs of filter discs 1. A number of such pairs of wheels 12 with pairs of filter discs 1 may conveniently be mounted on the same shaft 3 to form a unit within the same casing 2. There are rubber strips 16 fitted on the cylindrical surface 5 of the casing 2, to form a seal with the edges of the filter discs 1. Spray tubes 13 for directing water against the outsides of filter discs 1, are provided above the horizontal shaft 3 and inside casing 2 and between the pairs of filter discs. There are air tubes 14 for air blast, also directed against the outsides of filter discs 1, arranged in the same way.

On cylindrical surface 5 of casing 2 there are inlet openings 6 for introducing the liquid or suspension to be filtered between each pair of filter discs. Inlet openings 6 are in communication with a container 17 for the suspension, situated outside the casing 2. There is provided in addition, in the cylindrical surface 5 of casing 2, and substantially diametrically opposite inlet openings 6, discharge openings 8 having an adjustable plate 7 for controlling the material that does not pass through the pair of filter discs 1. There is a discharge channel communicating with the discharge openings 8. On the cylindrical surface 5 of casing 2 there is also, below discharge openings 8 an outlet 10 for the purified liquid or filtrate which is provided with a means 9 for controlling the liquid level, and at the lowest point of the filter unit there is a sump pipe 11 which is designed to collect heavy impurities such as metal particles. Sump pipe 11 may if desired also be used to supply the suspension or a part thereof to space 4 between filter discs 1.

It is best to make discharge openings 8 somewhat narrower than space 4 between the pairs of filter discs 1. A higher concentration of discharging separated material is obtained in this way.

The plate 7 extends across the discharge openings 8 for the separated material and is constructed as a blocking plate. This can be adjusted to enlarge or reduce the area of discharge openings 8, through the action of a linkage 19 activated by the movement of a float 18 situated in container 17 near the inlet opening 6. The position of this blocking plate therefore depends on the liquid level in the container near inlet opening 6, and the blocking plate, depending on this level, can thus increase or decrease the removal through the discharge openings 8 of the separated material. Container 17 near inlet opening 6, is provided with a float 18, and is provided with an overflow 24.

The means for controlling the liquid level in space 15 in outlet 10 for purified liquid consists of a partition 9 situated at right angles to the direction of outward flow, and fitted with a gate 20. The gate pivots about a horizontal axis in the partition 9 and is weighted. The gate 20 is opened, against the action of weight 21, by the pressure of the purified liquid in front of the partition in space 15. Gate 20 has a sector-shaped head 22 at the top. This means that the purified liquid can only discharge through the opening in the lower part of the gate 20 when open. In this way it has been possible to reduce the weight of the counterweight.

An outline of the operation of the filter unit is as follows. The fibrous material to be filtered is admitted from the container 7 to the inlet openings 6 in the cylindrical surface of casing 2 and enters space 4 between the pairs of filter discs 1. Shaft 3 with wheels 12 and filter discs 1 are rotated slowly in casing 2, resulting in the edges of filter discs 1 sliding along rubber strips 16 on the inside of cylindrical surface 5 of casing 2 in such a way as to make a liquid-tight seal. The material is all the time being admitted to the space 4 between the pairs of filter discs 1 through inlet openings 6 and begins to fill that part of space 4 which is situated below shaft 3. The liquid is forced out through the filter discs 1 which are situated below shaft 3 and into space 15 through openings 15a between the inside of casing 2 and the outsides of filter discs 1, from where the purified liquid is removed from the filter unit through outlet 10 fitted with the partition 9 and the gate 20.

The liquid level in space 4 between the pairs of filter discs 1 is regulated by means of plate 7 across the discharge openings 8 which are situated diametrally opposite inlet openings 6 in the cylindrical surface 5 of casing 2. In this connection it is best if plate 7 is adjusted so that the liquid level in space 4 is slightly below the centre line of the horizontal shaft 3. As a result of the rotation of shaft 3 and the direction of flow of the material, the particles which do not pass through filter discs 1 will be forced out through discharge openings 8. This is due partly to the pressure of the material entering through inlet opening 6 and partly to the fact that a certain gravity flow will be achieved through discharge openings 8 when the unit is rotating, if the liquid level is kept at a suitable height in relation to shaft 3. By connecting plate 7, shaped as a blocking plate, to float 18 in container 17 near inlet opening 6, it is thus possible to increase or decrease the flow through discharge openings 8, depending on the liquid level in the container.

Heavier impurities in the material, such as particles of metal, sink because of their weight down to sump tube 11 where they may be collected and removed. Sump pipe 11 may also be used for supplying a suspension containing smaller fibres to space 4 between filter discs 1. This supply is usually a partial flow and the suspension containing larger particles, which was earlier admitted through the ordinary inlet openings 6, will prevent the suspension containing smaller fibres from completely passing through filter discs 1.

The separated material normally rolls off the inside walls of the filter discs due to its own weight, and falls through discharge openings 8 onto a draining surface 23. In certain circumstances it may however be useful to be able to remove effectively the particles that have become wedged on the insides of filter discs 1, by a continuous supply of water and/or air through spray tubes 13 and/or air tubes 14 respectively, which are fitted between the inside of casing 2 and the outsides of filter discs 1 in the upper portion of the filter unit as described above.

The invention is not restricted to the constructional form described but may be varied within the framework of the appended claims. It is naturally possible to design the seal 16 between the periphery of the filter discs 1 and the cylindrical surface 5 of the casing 2 in a different way. Also, the liquid level in space 4 between the filter discs 1 may be regulated in some way other than through the movement of the blocking plate 7 as a result of the action of linkage 19 activated by float 18 in the container 17 near inlet openings 6. It is naturally possible to make use of other types of sensors placed in the container 17 to control both discharge and inflow. The construction of the unit also makes possible the use of negative pressure, either intermittent or continuous, in order to increase the capacity of the filter discs 1.

I claim:

1. A filter unit for fibrous suspensions comprising a casing, a cylindrical element therein, a horizontal shaft rotatably mounted in the walls of said casing, at least one pair of spaced circular filter discs mounted on said shaft and within said cylindrical element, means for providing a liquid-tight seal between the peripheries of said filter discs and said cylindrical element, said cylindrical element being provided with an inlet opening for each pair of spaced filter discs and communicating with the space therebetween and on one lateral side of said cylindrical element, a discharge opening for each pair of spaced filter discs communicating with the space therebetween and on the opposed lateral side of said cylindrical element, an outlet opening adjacent the bottom of said cylindrical element, an outlet opening adjacent the bottom of said cylindrical element communicating with the outsides of said at least one pair of spaced filter discs, means for rotating said shaft and filter discs so to convey the suspension from said inlet opening to the outlet opening and thence to said discharge opening, whereby at least a part of the filtrate liquid which passes through the filter discs is removed through said outlet opening and the fibrous material remaining in the space between said at least one pair of filter discs is removed through said discharge opening.

2. A filter unit as claimed in claim 1 and further comprising means for controlling the level of the filtrate liquid on the outside of the at least one pair of spaced filter discs and pipe means at the lowest point of said cylindrical element in communication with the space between said at least one pair of spaced filter discs for removal of heavy impurities in the fibrous suspension.

3. A filter unit as claimed in claim 2 wherein at least a portion of said fibrous suspension is introduced through said pipe means to the space between the at least one pair of spaced filter discs when there is an absence of heavy impurities.

4. A filter unit as claimed in claim 1 and further comprising a movable plate member for controlling the size of the discharge opening, a container for the fibrous suspension to be introduced through the inlet opening for each of said at least one pair of spaced filter discs and means operable by the level of the suspension in said container for controlling the movement of said plate member.

5. A filter unit as claimed in claim 4 and further comprising an overflow device for said container.

6. A filter unit as claimed in claim 2 wherein said means for controlling the level of filtrate liquid comprises a movable partition controlling the outward flow of the liquid and means responsive to the pressure of the filtrate liquid for opening and closing said movable partition.

7. A filter unit as claimed in claim 1 and further comprising means for directing a fluid against the outside surface of said at least one pair of spaced filter discs above the rotatable shaft for dislodging fibrous material adhering to the inside surfaces of said filter discs.